Figure 1:
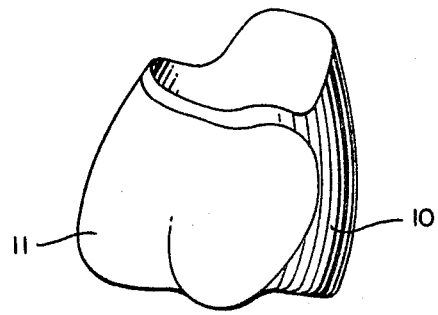

Feb. 24, 1959 E. GORDON 2,874,832
PROSTHETIC DENTAL PRODUCT
Filed Jan. 2, 1958

INVENTOR.
Eliot Gordon
BY

United States Patent Office 2,874,832
Patented Feb. 24, 1959

2,874,832

PROSTHETIC DENTAL PRODUCT

Eliot Gordon, Newton, Mass.

Application January 2, 1958, Serial No. 706,779

4 Claims. (Cl. 206—63.5)

This invention comprises a new and improved product for use in prosthetic dentistry which will provide the technician with pre-mixed and pre-shaded acrylic resin ready for immediate packing in crown or bridgework.

Acrylic resins have been more and more widely used in this field and are usually compounded on the spot by the dentist or technician from granular polymer and liquid monomer with the addition of pigment for color and opacity. There are, however, many shortcomings to the present-day practice. It is almost impossible to obtain consistently uniform results since material handling, shade formulation and blending is bound to vary with individual cases. There are also other variances that usually cannot be controlled to a satisfactory extent because of the operative limitations of the dentist. Some of the common and unavoidable variations that occur may be due to differences in gold framework thickness, to scant acrylic veneer thickness, or to interference by mechanical retention loops in acrylic veneer areas. Furthermore, variations occur in the colors of golds used in crown and bridge construction as well as differences in the thickness of opacifying media for blocking out the transmission of gold color through the acrylic resin. Bleeding of the opacifying media varies from case to case, and human error in mixing monomer and polymer ingredients is an ever present danger. Finally, individual methods of packing acrylic resins cannot be standardized.

Some or all of the above mentioned difficulties may be present when the technician faces the task of endeavoring to obtain an exact pre-chosen tooth shade. Due to the nature of the laboratory business itself, he may not be able to allot time to correct these situations and cannot adapt a sure-fire acrylic packing technique for himself. His results vary from only fair to excellent.

Other difficulties due to faulty mixing of the granular polymer and the liquid monomer acrylic lead to errors in respect to dense shades, translucent shades, reflection of gold through the plastic, bleeding of opacifying media, and uncontrollable blending of body and enamel shades.

The difficulties above discussed are eliminated and important advantages achieved in accordance with the present invention by my novel product which comprises, as an article of merchandise, a composite strip of pre-shaded, pre-opacified, pre-mixed acrylic resin molded for instant use and insuring consistently standard and accurate results. The resin is held in partially polymerized condition and the strip may be severed into slugs of the proper size when and as the dentist is ready to use them.

Figure 2:
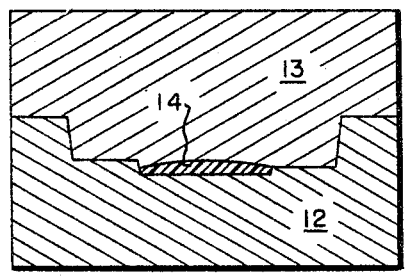
Figure 3:
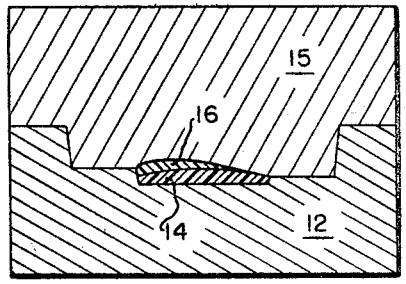
Figure 4:
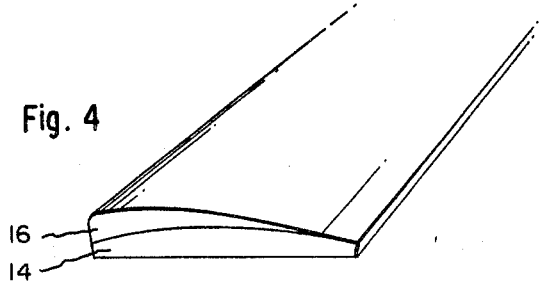
Figure 5:
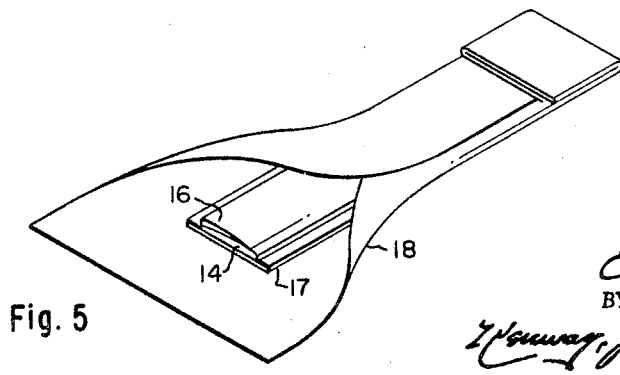

These and other features and advantages of my invention will be best understood and appreciated from the following description of a preferred embodiment thereof selected for purposes of illustration and shown in the accompanying drawings in which:

Fig. 1 is a view in perspective on a greatly enlarged scale of a veneer crown and cast occlusal gold pontic, Fig. 2 is a view in cross-section of dies for molding a lower or body section of the composite product, Fig. 3 is a similar view of the dies for completing the product, Fig. 4 is a fragmentary view in perspective on an enlarged scale of the product, and Fig. 5 is a fragmentary view in perspective showing the product as sealed for distribution.

In Fig. 1 is shown a cast occlusal gold crown 10 of more or less conventional shape which serves as the framework of an acrylic replacement 11 of the otherwise missing portions of the original tooth which are exposed to full view at any time in the mouth of the wearer. The present invention provides for the first time a pre-shaded, pre-opacified and pre-mixed acrylic resin in a form ready for instant use in producing such a replacement as that shown herein.

The product of my invention may be produced in the following manner. Acrylic polymer in powdered form and acrylic monomer in liquid form, or co-polymer thereof, in proportion of 3 to 1 or thereabouts are mixed and to the mixture is added powdered pigment for opacifying and shading the mix to the desired body tint of the tooth. These ingredients are, in mixing, transformed into a moldable paste or jell that is now placed in a channel of the proper cross section in a lower female mold 12 as shown in Fig. 2. A cooperating upper mold 13 is now brought into action and the jell molded into the form required for the lower or body portion 14 of the final composite strip; that is to say, a long strip uniform and symmetrical in cross section having a flat lower face and a slightly concave upper face.

A second mixture of acrylic polymer and monomer is now made with sufficient pigment to pre-shade it but to leave it translucent as distinguished from the opaqueness of the body section 14. This translucent mixture in paste or jell form is superposed upon the body section 14 and molded thereon through the operation of a second upper die 15 having a channel in its operative face of the cross section shown in Fig. 3; that is to say, a curvature imparting a convex shape to the upper surface of the strip 16 and causing it to merge in tangent relation to the right hand edge of the body strip 14. The body strip is thus exposed throughout that portion of the composite strip which lies adjacent to the gingival portion of the tooth. On the other hand, the translucent section 16 has its maximum thickness at the left edge of the body section 14 as shown in Fig. 3 corresponding to the incisal edge of the tooth.

The composite strip produced as above explained is now removed from the dies in the form shown on an enlarged scale in Fig. 4 and is made ready for packing and distribution by being provided with a tough or firm flexible backing such as a strip of impervious plastic-coated pasteboard 17 to which it may be lightly secured by an intermediate layer of fine opacifying media with affinity to the plastic strip, the plastic-coated pasteboard being impervious to the resin employed and slightly wider than the body strip 14, allows the composite strip to be peeled from it intact with the opacifying material or media adhering to it.

The composite strip assembled in this manner may then be enclosed in a moisture-proof wrapper 18 of metallic foil or the like. It will be understood that when this strip is removed from the molds it is in a partially polymerized condition in which it is well adapted to be packed into framework such as that suggested in Fig. 1 or other jacket, crown, bridge or splint used in prosthetic dentistry and may be hardened by such means as heat or pressure, or both. The resin may be maintained for several months shelf life by being sealed in an atmosphere of the acrylic monomer. The wrapping 18 in many cases is adequate for that purpose although it is contemplated that the wrapping may be supplemented by enclosure in a transparent tube or the like.

Having thus disclosed my invention and described in detail an illustrative embodiment thereof, I claim as new and desire to secure by Letters Patent:

1. A prosthetic dental product comprising a flexible composite strip of partially polymerized acrylic resin including a base portion which is colored and substantially opaque, an overlying veneer portion bonded thereto and which is translucent and of lighter shade than the base portion, a supporting strip of tough sheet material, and an opaque coating of fine ground acrylic polymer adhesively securing the composite strip by its base to the supporting strip, the composite strip being severable into slugs for packing into crown or bridgework.

2. A prosthetic dental product comprising a flexible composite strip of partially polymerized acrylic resin including a base portion which is substantially opaque and pretinted, and an overlying translucent veneer portion bonded thereto and of lighter shade than the base portion, the said composite strip being hermetically sealed in a portable enclosure and maintained partially polymerized therein by an atmosphere of acrylic monomer.

3. A prosthetic dental product comprising a flexible composite strip of a moldable dough which is a mixture of acrylic polymer and liquid monomer and includes a base portion which is colored and substantially opaque, an overlying veneer portion bonded thereto and which is translucent and of lighter shade than the base portion, a supporting strip of sheet material, and an opaque coating of acrylic polymer adhesively securing the composite strip by its base to the supporting strip, the opaque base portion extending laterally less than the full width of the supporting strip and the overlying translucent portion having a maximum thickness at one edge of the base portion and tapering to a feather edge adjacent to the other.

4. The prosthetic dental product of claim 3 further characterized by being hermetically sealed in a portable enclosure and maintained partially polymerized therein by its own atmosphere of acrylic monomer.

References Cited in the file of this patent
UNITED STATES PATENTS
2,659,970   Ingersoll _____ Nov. 24, 1953